United States Patent Office 3,030,664
Patented Apr. 24, 1962

3,030,664
MANUFACTURE OF REINFORCED LIGHT-WEIGHT CONCRETE
Endel Wijard, Sodertalje, Sweden, assignor, by mesne assignments, to Casius Corporation Limited, Montreal, Quebec, Canada
No Drawing. Filed July 3, 1956, Ser. No. 595,588
Claims priority, application Sweden July 13, 1955
15 Claims. (Cl. 18—47.5)

This invention relates to the manufacture of reinforced light-weight concrete and more particularly to a method for increasing the adhesion between the reinforcing elements and the concrete in reinforced steam-cured light-weight concrete.

In reinforced light-weight concrete as well as in reinforced ordinary concrete it is endeavoured to obtain a cooperation between the reinforcing elements, generally iron or steel rods, and the concrete itself in order to increase the strength of the reinforced products. For this purpose, the reinforcements are often arranged or located in such a way in the concrete bodies or constructions that they chiefly take up the tensile stresses while the concrete takes up the compressive stresses. In order to achieve a distribution of the stresses in this way, however, it is necessary that the reinforcing irons shall not slip in the concrete.

In the case of ordinary concrete such a slip is often prevented by anchoring the ends of the reinforcing irons, by bending them for example, and also by constructing the reinforcements in the form of toothed irons or the like. Moreover, in ordinary concrete the natural friction between the concrete and the reinforcing irons is very considerable, which is mainly due to the great strength of the concrete whereby it can retain its strong grip on the reinforcing irons obtained during casting.

In the case of light-weight concrete conditions are different due to its lower strength and on account hereof greater difficulties are experienced in obtaining a satisfactory cooperation between the reinforcing elements and the light-weight concrete. Attempts have been made to anchor the reinforcing irons by welding on cross pins at the ends of the irons, or by bending the ends of the irons, but these measures increase the weight of the reinforcements which is not consistent with the desire to keep down the unit weight or density of the light-weight concrete products, such as slabs, blocks or the like. The same unsatisfactory result is obtained from the proposal to cast in the reinforcing irons into narrow beams of ordinary concrete which beams are subsequently embedded in light-weight concrete.

It has now been found, according to the present invention, that the above-mentioned difficulties in the manufacture of reinforced steam-cured light-weight concrete can be overcome if the metal reinforcing elements are provided with a coating comprising a suspension of a hydraulic cement and rubber in suitable proportions which forms a tight, very tough and elastic surface film thereon, and, after casting the reinforcing elements so-treated into light-weight concrete and subsequent steam-curing of the product, is converted into a hard strong layer having an excellent adhesion both to the reinforcing elements, such as iron and steel rods, and the surrounding light-weight concrete. In addition, the coating also serves as an excellent rust-protective film for the reinforcing iron and steel elements.

Generally, the preparation of the coating composition according to the invention takes place by suspending the components, natural or synthetic rubber and a hydraulic cement, such as Portland cement, in a suitable suspension medium in such proportions that a slurry of suitable consistency for applying to the reinforcing elements is obtained. Also other substances may be added, for example setting regulators for the cement, such as gypsum or sugar. The application of the coating may be effected by dipping or immersing the reinforcing elements in the coating composition or by spraying or painting the latter on the reinforcing elements. After drying the coating, the reinforcing elements are embedded in light-weight concrete and the product is then steam-cured in the conventional manner, for example under a pressure of 4–12 kg./cm.$^2$.

More specifically, the cement-rubber suspension according to the invention may be prepared in various different ways. Thus, for example, the rubber may be dissolved in a suitable organic solvent, whereupon the cement is suspended in the solution so obtained. Suitable solvents for this purpose are, for example, chlorinated hydrocarbons, such as trichloroethylene, cyclic hydrocarbons, such as benzene and toluene, but also aliphatic hydrocarbons, such as white spirits and solvent naphtha, either solely or in mixture with the above-mentioned solvents. The proportions of solvent, rubber and cement are chosen in such a way that the mixture forms a thin slurry which may be easily applied as a coating, for example by dipping the reinforcing elements therein. On evaporation of the solvent, the cement particles in this coating are bound together by the rubber forming a very flexible and elastic film on the reinforcing elements. When said elements are then embedded in light-weight concrete and the product is steam-cured, the cement is hydrated while the rubber is softened and fills the pores of the hydrated product.

According to a modification, both the hydraulic cement and the rubber may be suspended in an organic liquid in which the rubber is insoluble, for example alcohols, especially ethyl alcohol, further acetone and dioxan. In this case, however, after the coating has been applied and the evaporation of said organic liquid has taken place, moisture must be supplied to the coating, so that the cement will set sufficiently to enable the coating to hold together until it has been steam-cured.

In practice, however, it has been found most suitable to employ water as the suspension medium. Hereby conveniently rubber latex as available in the market for use in the rubber industry may be employed, including natural rubber latex and synthetic rubber latex-polybutadiene rubber, polybutadiene-styrene rubber, polyisobutadiene (butyl rubber), polybutadiene-acylonitrile (nitrile rubber), chloroprene (neoprene) rubber, for example—stabilized in the usual manner with caustic ammonia, and, may be, also casein.

These rubber latex emulsions generally contain about 60–62% of rubber and may be used in the condition in which they are available in the market, but sometimes it may be of advantage to add a small amount of stabilizer thereto, in addition to that already present.

Suitable stabilizers for this purpose are besides ammonia and casein, for example trisodium phosphate, sodium hydroxide and protective colloids comprising proteins and metal salts. Generally, the latex is diluted with water before suspending the cement therein. Any suitable hydraulic cement may be used, for example Portland cement, alumina cement and slag or natural cement. Generally, however, Portland cement is preferred.

In addition, also a small amount of a setting regulator for the cement may be added, for example gypsum, calcium chloride, sugar and proteins, such as casein. Consequently, casein can serve both as a stabilizing agent for the latex and as a setting regulator for the hydraulic cement.

The proportions of cement and rubber latex in the coating composition of the invention should be such that the surface coating layer or film produced in the steam-curing will be hard, dense and at the same time satisfactorily adhesive both to the reinforcing elements and the surrounding light-weight concrete. It has been found that this is achieved when the latex is added in such an amount that the rubber content thereof is from about 1 to 15% by weight, based on the hydraulic cement. Usually satisfactory results are obtained within the range of 1 to 10%. If the reinforcing elements have been subjected to a rough handling and exhibit a rough surface, the higher percentages of latex should be chosen, while in other cases a lower latex content will meet requirements. In practice, additions of latex corresponding to a rubber content of 1 to 5% by weight, based on the hydraulic cement, have been successfully employed, and in case of using natural rubber latex generally amounts of latex containing 2.5 to 4% of rubber are sufficient.

As indicated above, the method according to the invention prior to steam-curing results in the production of a tough and elastic adhesive coating on the reinforcing elements which will not crack or chip off in the handling or transportation of the elements. In the steam-curing treatment, this surface coating is converted into a dense and hard layer which not only adheres easily to the reinforcing iron and steel rods with considerable power but also becomes reliably attached to the surrounding light-weight concrete. It is known that calcium hydrosilicates may advantageously be added as fillers in rubber improving its adhesive properties, and it appears probable that the hydrosilicates formed in the coating during the steam-curing may have a similar effect, which may explain the satisfactory results obtained according to the invention.

It has been found that when light-weight concrete contains certain sulphur compounds, such as sulphides, the latter in the steam-curing will react with the rubber and will vulcanize the same, whereby the adhesive properties of the coating layer or film are further improved. In view hereof, sulphur may purposely be added to the coating composition in order to produce a vulcanization of the rubber, for example in amounts of from about 1 to 10%, preferably 2 to 5%, by weight of elementary sulphur, based on the weight of the rubber.

More specifically, the proportions of the components for producing the coating composition according to the invention may suitably be within the following ranges, the parts being parts by weight:

Hydraulic cement _____ 100 parts.
Rubber latex (60–62%) _____ 1–25 parts, preferably 1–8 parts.
Caustic ammonia (8–14%) ___ 1–2 parts.
Casein _____ 1–5 parts, preferably 1–2 parts.
Water _____ 20–40 parts, preferably 25–35 parts.

When preparing the mixture, generally ammonia is added to the water, whereupon the casein is dissolved in the alkaline solution so obtained. The latex is then added to the solution, whereafter the cement is suspended therein. The suspension is applied to the reinforcing elements, for example iron or steel rods, or reinforcing mats, as indicated above, by dipping, brushing or spraying or other methods, and the coating is then dried, preferably by air-drying. After casting the reinforcing elements so-treated into the light-weight concrete, steam-curing is carried out under a pressure of 5–12 kg./cm.$^2$, preferably 8–10 kg./cm.$^2$, for example during a period of 5–25 hours.

More specific examples of the coating composition are the following, wherein the parts are parts by weight:

*Example 1*

|  | Parts |
|---|---|
| Portland cement | 100 |
| Water | 30 |
| Caustic ammonia | 1 |
| Casein | 2 |
| Natural rubber latex (60–62%) | 4 |

The components are mixed, as indicated above, and the mixture is well-worked. The coating slurry so obtained is applied to metal reinforcing rods or mats, for example by spraying, or by dipping the reinforcing elements in the coating composition. The coating is then allowed to dry in the air, which generally takes place in a few hours. In this way a tight, well adhering elastic film is formed on the reinforcing elements which are then ready for casting into the light-weight concrete. Hereupon the product so obtained is subjected to steam-curing under a pressure of 5–12 kg./cm.$^2$ for about 5–20 hours, whereby the coating is converted into a hard, dense layer which is effectively united with the surrounding light-weight concrete.

*Example 2*

|  | Parts |
|---|---|
| Portland cement | 100 |
| Water | 35 |
| Caustic ammonia | 2 |
| Casein | 2 |
| Natural rubber latex (60–62%) | 7 |

The preparing of the mixture and the application thereof and steam-curing takes place as in the previous example.

*Example 3*

|  | Parts |
|---|---|
| Portland cement | 100 |
| Water | 33 |
| Caustic ammonia | 1 |
| Casein | 1 |
| Sulphur | 0.5 |
| Natural rubber latex (60–62%) | 8 |

The mixing of the components and the application of the coating on the reinforcing elements takes place as indicated above. In the steam-curing, for example under a pressure of 8–10 kg./cm.$^2$, the sulphur will react with the rubber producing vulcanized rubber.

*Example 4*

|  | Parts |
|---|---|
| Slag cement | 100 |
| Water | 25 |
| Caustic ammonia | 1 |
| Casein | 3 |
| Natural rubber latex (60–62%) | 2.5 |

Preparation of the mixture, applying of the coating and steam-curing is effected as in the previous examples.

*Example 5*

|  | Parts |
|---|---|
| Portland cement | 100 |
| Water | 30 |
| Caustic ammonia | 1 |
| Casein | 2 |
| Butyl rubber latex (about 60%) | 4 |

Mixing of the components, applying the coating and steam-curing takes place as in the previous examples.

*Example 6*

|  | Parts |
|---|---|
| Portland cement | 100 |
| Water | 32 |
| Trisodium phosphate | 2 |
| Casein | 1 |
| Natural rubber latex (60–62%) | 5 |

Preparation of the mixture, applying the coating and steam-curing is effected as in the previous examples.

*Example 7*

|  | Parts |
|---|---|
| Portland cement | 100 |
| White spirits | 40 |
| Crude rubber | 4 |

The rubber is dissolved in the solvent and the cement is then suspended in the solution so obtained, whereupon the suspension is applied to the reinforcing irons. After evaporation of the solvent, the reinforcing elements so treated are cast into light-weight concrete and the product is subjected to a steam-curing, similarly as described in Example 1.

In other respects, apart from the preparation of the adhesive coating on the reinforcing elements, the manufacture of reinforced light-weight concrete according to the invention is carried out according to methods known per se. Consequently, the light-weight concrete mixture in which the said reinforcing elements, coated in accordance with the invention, are embedded may be prepared from a mixture of siliceous materials and lime-containing materials, such as sand, ground sand, blast-furnace slag, fly ash, hydraulic cement, slaked or unslaked lime, etc. in conventional proportions and containing additions in the form of gas-developing substances, such as aluminum powder, foam or foam-producing substances, such as alkylaryl sulphonates, setting regulators, such as gypsum and sugar, etc., as known per se.

Although various embodiments of the invention have been indicated above, it will be understood that several modifications and alterations therein may be made without departing from the principles of the invention.

What I claim is:

1. In the manufacture of reinforced steam-cured light-weight concrete, the process which comprises coating metal reinforcing elements with a slurry comprising a suspension of a hydraulic cement and rubber, said suspension containing from about 1 to 15% by weight of rubber, based on the hydraulic cement, drying the coating, thus producing a tough and elastic coating film on the reinforcements, casting the reinforcing elements so-treated into light-weight concrete and subjecting the product to a steam-curing, whereby the coating is converted into a hard and strong layer adhering effectively to the reinforcing elements as well as to the surrounding light-weight concrete.

2. The process of claim 1 wherein the rubber is added in the form of stabilized rubber latex.

3. The process of claim 2 wherein the stabilizer is caustic ammonia.

4. The process of claim 2 wherein the stabilized rubber latex is stabilized natural latex.

5. In the manufacture of reinforced steam-cured light-weight concrete, the process which comprises coating metal reinforcing elements with a slurry comprising a suspension of Portland cement and stabilized natural rubber latex, said suspension containing from about 1 to 15 parts by weight of rubber to 100 parts of Portland cement, drying the coating, thus producing a tough and flexible film on the reinforcements, casting the reinforcing elements so-treated into light-weight concrete and subjecting the product to a steam-curing, whereby the coating is converted into a hard and strong layer adhering effectively to the reinforcing elements as well as the surrounding light-weight concrete.

6. The process of claim 5 wherein steam-curing is carried out under a pressure of about 5–12 kg./cm.$^2$.

7. In the manufacture of reinforced steam-cured light-weight concrete, the process which comprises preparing a coating composition containing by weight: 100 parts of hydraulic cement, 1 to 25 parts of rubber latex (60–62% rubber), 1 to 2 parts of caustic ammonia, 1 to 5 parts of casein and 20 to 40 parts of water, applying said coating composition to iron and steel reinforcing elements, drying the coating, thus producing a tight and elastic coating film on the reinforcing elements, casting the reinforcing elements so-treated into light-weight concrete and subjecting the product to a steam-curing, whereby the coating is converted into a hard and strong layer adhering effectively to the reinforcing elements as well as the surrounding light-weight concrete.

8. The process of claim 7 wherein from about 1 to 10 parts of elementary sulphur, based on the weight of the rubber, is added to the coating composition to produce a vulcanization of the rubber in the steam-curing operation.

9. In the manufacture of reinforced steam-cured light-weight concrete, the process which comprises preparing a coating composition containing by weight: 100 parts of Portland cement, from about 1 to 8 parts of natural rubber latex having a concentration of about 60% rubber, from about 1 to 2 parts of caustic ammonia, from about 1 to 2 parts of casein and from about 25 to 35 parts of water, applying said coating composition to metal reinforcing elements, drying the coating, thus producing a tough and elastic coating film on the reinforcing elements, casting the reinforcing elements so-treated into light-weight concrete and subjecting the product to a steam-curing under a pressure of 5–12 kg./cm.$^2$, whereby the coating is converted into a hard and strong layer adhering effectively to the reinforcing elements as well as the surrounding light-weight concrete.

10. The process of claim 1, wherein the suspension of hydraulic cement and rubber is prepared by dissolving the rubber in an organic solvent and suspending the hydraulic cement therein.

11. The process of claim 10 wherein the organic solvent is white spirits.

12. In the manufacture of reinforced steam-cured light-weight concrete, the process which comprises coating metal reinforcing elements with a slurry comprising a suspension of a hydraulic cement, a stabilized rubber latex and casein, said suspension containing from about 1 to 15% by weight of rubber, based on the hydraulic cement, drying the coating, thus producing a tough and elastic coating film on the reinforcements, casting the reinforcing elements so treated into light-weight concrete and subjecting the product to a steam-curing, whereby the coating is converted into a hard and strong layer adhering effectively to the reinforcing elements as well as to the surrounding light-weight concrete.

13. In the manufacture of reinforced steam-cured light-weight concrete, the process which comprises coating metal reinforcing elements with a slurry comprising a suspension of a hydraulic cement and rubber, the steps comprising the adding of ammonia to water, dissolving casein in the alkaline solution so obtained, and subsequently adding latex to the solution whereafter the cement is suspended therein.

14. In the manufacture of reinforced steam-cured light-weight concrete, a process which comprises coating metal reinforcing elements with a slurry comprising a suspension of approximately the following composition:

| | Parts |
|---|---|
| Hydraulic cement | 100 |
| Rubber latex (60–62% rubber) | 1–25 |
| Caustic ammonia (8–14%) | 1–2 |
| Casein | 1–5 |
| Water | 20–40 |

15. In the manufacture of reinforced steam-cured light-weight concrete, a process which comprises coating metal reinforcing elements with a slurry comprising a suspension of approximately the following composition:

| | Parts |
|---|---|
| Portland cement | 100 |
| Water | 30 |
| Caustic ammonia | 1 |
| Casein | 2 |
| Natural rubber latex | 4 |

References Cited in the file of this patent

UNITED STATES PATENTS

| | | |
|---|---|---|
| 2,248,098 | Cornelius et al. | July 8, 1941 |
| 2,339,163 | Friedlaender et al. | Jan. 11, 1944 |
| 2,591,625 | Simonsson | Apr. 1, 1952 |
| 2,611,945 | Simonsson | Sept. 30, 1952 |
| 2,768,094 | Gemmel et al. | Oct. 23, 1955 |